US012737006B2

(12) United States Patent
Carnevali

(10) Patent No.: US 12,737,006 B2
(45) Date of Patent: Sep. 15, 2026

(54) DOCK WITH ISOLATED DOCK CONNECTOR AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 268 days.

(21) Appl. No.: 18/233,218

(22) Filed: Aug. 11, 2023

(65) Prior Publication Data

US 2025/0053196 A1 Feb. 13, 2025

(51) Int. Cl.
*G06F 1/16* (2006.01)

(52) U.S. Cl.
CPC .................................. *G06F 1/1632* (2013.01)

(58) Field of Classification Search
CPC ............................. G06F 1/1632; G06F 1/1684
USPC ..................................................... 361/679.41
See application file for complete search history.

(56) References Cited

U.S. PATENT DOCUMENTS

| | | | |
|---|---|---|---|
| 809,977 | A | 1/1906 | O'Brien |
| 1,786,459 | A | 12/1930 | Simons |
| 2,495,552 | A | 1/1950 | Schmitz |
| 2,549,917 | A | 4/1951 | Millbrandt |
| 2,565,939 | A | 8/1951 | Wriston |
| 2,612,947 | A | 10/1952 | Jenks |
| 2,717,093 | A | 9/1955 | Mautner |
| 2,803,368 | A | 8/1957 | Koch |

(Continued)

FOREIGN PATENT DOCUMENTS

| | | |
|---|---|---|
| CN | 1312603 | 9/2001 |
| CN | 101674096 | 3/2010 |

(Continued)

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Imani N Hayman
*Assistant Examiner* — Ross Terry Mularski
(74) *Attorney, Agent, or Firm* — Branch Partners PLLC; Bruce E. Black

(57) ABSTRACT

A dock for an electronic device includes a base configured to fit over at least a portion of a back surface of the electronic device; a tray extending from the base for receiving one side of the electronic device; and a dock connector arrangement that includes a dock connector formed of a first rigid or hard plastic material, a plurality of contacts extending out of, or disposed on, the dock connector, an elastomeric sleeve molded around at least a perimeter of the dock connector, and a contact box, wherein at least a portion of the contact box is molded around at least a perimeter of the elastomeric sleeve, wherein at least the portion of the contact box is formed of a second rigid or hard plastic material, wherein the contact box is coupled to, or part of, the base or the tray.

20 Claims, 4 Drawing Sheets

(56) References Cited

U.S. PATENT DOCUMENTS

| | | | |
|---|---|---|---|
| 3,018,525 | A | 1/1962 | Deisenroth |
| 3,140,883 | A | 7/1964 | Anthony |
| 3,464,579 | A | 9/1969 | Asenbauer |
| 3,667,648 | A | 6/1972 | Koziol |
| 3,808,577 | A | 4/1974 | Mathauser |
| 3,885,701 | A | 5/1975 | Becklin |
| 3,972,459 | A | 8/1976 | Cooper |
| 3,978,830 | A | 9/1976 | Toth, Jr. |
| 4,298,204 | A | 11/1981 | Jinkins |
| 4,564,880 | A | 1/1986 | Christ et al. |
| 4,607,772 | A | 8/1986 | Hancock |
| 4,828,558 | A | 5/1989 | Kelman |
| 4,842,174 | A | 6/1989 | Sheppard et al. |
| 4,848,319 | A | 7/1989 | Appeldorn |
| 5,002,184 | A | 3/1991 | Lloyd |
| 5,052,943 | A | 10/1991 | Davis |
| 5,096,317 | A | 3/1992 | Phillippe |
| 5,135,189 | A | 8/1992 | Ghazizadeh |
| 5,246,133 | A | 9/1993 | James |
| 5,272,771 | A | 12/1993 | Ansell et al. |
| 5,295,602 | A | 3/1994 | Swanson |
| 5,353,934 | A | 10/1994 | Yamauchi |
| 5,388,692 | A | 2/1995 | Withrow et al. |
| 5,457,745 | A | 10/1995 | Wang |
| 5,535,274 | A | 7/1996 | Braitberg et al. |
| 5,584,054 | A | 12/1996 | Tyneski et al. |
| 5,586,002 | A | 12/1996 | Notarianni |
| 5,641,065 | A | 6/1997 | Owens et al. |
| 5,646,649 | A | 7/1997 | Iwata et al. |
| 5,708,707 | A | 1/1998 | Halttunen et al. |
| 5,791,506 | A | 8/1998 | Sheffler et al. |
| 5,813,096 | A | 9/1998 | Soennichsen |
| 5,822,427 | A | 10/1998 | Braitberg et al. |
| 5,842,670 | A | 12/1998 | Nigoghosian |
| 5,845,885 | A | 12/1998 | Carnevali |
| 5,860,550 | A | 1/1999 | Miller et al. |
| 5,888,087 | A | 3/1999 | Hanson et al. |
| 5,895,018 | A | 4/1999 | Rielo |
| 5,953,795 | A | 9/1999 | Bauer |
| 5,969,057 | A | 10/1999 | Schoeley et al. |
| 5,990,874 | A | 11/1999 | Tsumura et al. |
| 5,992,807 | A | 11/1999 | Tarulli |
| 6,009,601 | A | 1/2000 | Kaufman |
| 6,010,005 | A | 1/2000 | Reames et al. |
| 6,032,910 | A | 3/2000 | Richter |
| 6,034,505 | A | 3/2000 | Arthur et al. |
| 6,035,800 | A | 3/2000 | Clifford |
| 6,043,626 | A | 3/2000 | Snyder et al. |
| 6,068,119 | A | 5/2000 | Derr et al. |
| 6,149,116 | A | 11/2000 | Won |
| 6,191,943 | B1 | 2/2001 | Tracy |
| D439,218 | S | 3/2001 | Yu |
| 6,229,893 | B1 | 5/2001 | Chen |
| 6,273,773 | B1 | 8/2001 | Bourke |
| 6,276,552 | B1 | 8/2001 | Vervisch |
| 6,295,198 | B1 | 9/2001 | Loh et al. |
| 6,317,313 | B1 | 11/2001 | Mosgrove et al. |
| 6,341,218 | B1 | 1/2002 | Poplawsky et al. |
| 6,356,053 | B1 | 3/2002 | Sandoz et al. |
| 6,377,825 | B1 | 4/2002 | Kennedy et al. |
| 6,392,882 | B1 | 5/2002 | Chen et al. |
| 6,406,758 | B1 | 6/2002 | Bottari et al. |
| 6,407,860 | B1 | 6/2002 | Funazaki et al. |
| 6,438,229 | B1 | 8/2002 | Overy et al. |
| 6,561,476 | B2 | 5/2003 | Carnevali |
| 6,565,363 | B2 | 5/2003 | Downing |
| 6,572,176 | B2 | 6/2003 | Davies et al. |
| 6,585,212 | B2 | 7/2003 | Carnevali |
| 6,588,637 | B2 | 7/2003 | Gates et al. |
| 6,597,924 | B1 | 7/2003 | Smith |
| 6,614,423 | B1 | 9/2003 | Wong et al. |
| 6,646,864 | B2 | 11/2003 | Richardson |
| 6,648,376 | B2 | 11/2003 | Christianson |
| 6,687,516 | B2 | 2/2004 | Chen |
| 6,702,604 | B1 | 3/2004 | Moscovitch |
| 6,714,802 | B1 | 3/2004 | Barvesten |
| 6,754,343 | B2 | 6/2004 | Lundstrom et al. |
| 6,762,585 | B2 | 7/2004 | Liao |
| 6,776,422 | B1 | 8/2004 | Toy |
| 6,785,566 | B1 | 8/2004 | Irizarry |
| 6,785,567 | B2 | 8/2004 | Kato |
| 6,816,713 | B2 | 11/2004 | Chen |
| 6,842,171 | B2 | 1/2005 | Richter et al. |
| 6,953,126 | B2 | 10/2005 | Parker et al. |
| 6,984,680 | B2 | 1/2006 | Quinn |
| 6,995,976 | B2 | 2/2006 | Richardson |
| 7,017,243 | B2 | 3/2006 | Carnevali |
| 7,031,148 | B1 | 4/2006 | Lin |
| 7,054,042 | B2 | 5/2006 | Holmes et al. |
| 7,068,783 | B2 | 6/2006 | Peiker |
| 7,158,376 | B2 | 1/2007 | Richardson et al. |
| 7,180,735 | B2 | 2/2007 | Thomas et al. |
| 7,203,058 | B2 | 4/2007 | Hong |
| 7,230,823 | B2 | 6/2007 | Richardson et al. |
| 7,236,356 | B2 | 6/2007 | Ulla et al. |
| 7,248,901 | B2 | 7/2007 | Peiker |
| 7,257,429 | B2 | 8/2007 | Kogan |
| 7,283,849 | B2 | 10/2007 | Peiker |
| 7,311,526 | B2 | 12/2007 | Rohrbach et al. |
| 7,312,984 | B2 | 12/2007 | Richardson et al. |
| 7,320,450 | B2 | 1/2008 | Carnevali |
| 7,329,128 | B1 | 2/2008 | Awad |
| 7,351,066 | B2 | 4/2008 | DiFonzo et al. |
| 7,430,674 | B2 | 9/2008 | von Mueller et al. |
| 7,464,814 | B2 | 12/2008 | Carnevali |
| 7,480,138 | B2 | 1/2009 | Kogan et al. |
| 7,481,664 | B1 | 1/2009 | Knoll et al. |
| 7,517,222 | B2 | 4/2009 | Rohrbach et al. |
| 7,520,389 | B2 | 4/2009 | Lalouette |
| 7,551,458 | B2 | 6/2009 | Carnevali |
| 7,566,224 | B2 | 7/2009 | Wu |
| 7,573,706 | B2 | 8/2009 | Carnevali |
| 7,594,576 | B2 | 9/2009 | Chen et al. |
| 7,609,512 | B2 | 10/2009 | Richardson et al. |
| 7,612,997 | B1 | 11/2009 | Diebel et al. |
| 7,625,212 | B2 | 12/2009 | Du |
| 7,641,477 | B2 | 1/2010 | DiFonzo et al. |
| 7,645,143 | B2 | 1/2010 | Rohrbach et al. |
| 7,663,879 | B2 | 2/2010 | Richardson et al. |
| 7,688,580 | B2 | 3/2010 | Richardson et al. |
| 7,775,801 | B2 | 8/2010 | Shiff et al. |
| 7,782,610 | B2 | 8/2010 | Diebel et al. |
| 7,812,567 | B2 | 10/2010 | Shen |
| 7,841,776 | B2 | 11/2010 | DiFonzo et al. |
| 7,850,032 | B2 | 12/2010 | Carnevali et al. |
| 7,855,529 | B2 | 12/2010 | Liu |
| RE42,060 | E | 1/2011 | Carnevali |
| 7,889,489 | B2 | 2/2011 | Richardson et al. |
| 7,889,498 | B2 | 2/2011 | Diebel et al. |
| 7,894,180 | B2 | 2/2011 | Carnevali |
| 7,901,216 | B2 | 3/2011 | Rohrbach et al. |
| 7,907,394 | B2 | 3/2011 | Richardson et al. |
| 7,911,779 | B1 | 3/2011 | Tarnoff |
| 7,946,868 | B1 | 5/2011 | Chen |
| 7,946,891 | B2 | 5/2011 | Peiker |
| 7,970,440 | B2 | 6/2011 | Bury |
| RE42,581 | E | 8/2011 | Carnevali |
| 7,997,554 | B2 | 8/2011 | Carnevali |
| 8,054,042 | B2 | 11/2011 | Griffin, Jr. et al. |
| 8,061,516 | B2 | 11/2011 | Carnevali |
| 8,062,078 | B2 | 11/2011 | Asai et al. |
| 8,074,951 | B2 | 12/2011 | Carnevali |
| 8,080,975 | B2 | 12/2011 | Bessa et al. |
| 8,087,939 | B2 | 1/2012 | Rohrbach et al. |
| 8,099,138 | B2 | 1/2012 | Piekarz |
| 8,167,624 | B2 | 5/2012 | Hartlef et al. |
| 8,172,580 | B1 | 5/2012 | Chen et al. |
| 8,177,178 | B2 | 5/2012 | Carnevaali |
| 8,177,560 | B2 | 5/2012 | Rohrbach et al. |
| 8,179,672 | B2 | 5/2012 | Carnevali |
| 8,183,825 | B2 | 5/2012 | Sa |
| 8,224,408 | B2 | 7/2012 | Tomasini et al. |
| 8,295,043 | B2 | 10/2012 | Tai et al. |
| RE43,806 | E | 11/2012 | Carnevali |

(56) References Cited

U.S. PATENT DOCUMENTS 8,367,235 B2 2/2013 Huang
8,390,255 B1 3/2013 Fathollahi
8,405,974 B2 3/2013 Sayavong
8,414,312 B2 4/2013 Hung et al.
8,430,240 B2 4/2013 Kim
8,435,042 B2 5/2013 Rohrbach et al.
8,453,835 B2 6/2013 So
8,454,178 B2 6/2013 Carnevali
8,457,701 B2 6/2013 Diebel
8,483,758 B2 7/2013 Huang
8,497,753 B2 7/2013 DiFonzo et al.
8,505,861 B2 8/2013 Carnevali
8,531,833 B2 9/2013 Diebel et al.
8,553,408 B2 10/2013 Supran et al.
8,560,014 B1 10/2013 Hu et al.
8,634,887 B2 1/2014 Hu et al.
8,639,288 B1 1/2014 Friedman
8,646,698 B2 2/2014 Chen et al.
8,675,359 B2 3/2014 Chen
8,690,582 B2 4/2014 Rohrbach et al.
8,702,316 B2 4/2014 DiFonzo et al.
8,729,854 B2 5/2014 Tsai et al.
8,760,311 B2 6/2014 Heaton
8,763,802 B2 7/2014 Ellis-Brown
8,801,441 B2 8/2014 Zhang et al.
8,825,123 B1 9/2014 Gudino
8,833,716 B2 9/2014 Funk et al.
8,844,817 B2 9/2014 Glanzer et al.
8,873,233 B2 10/2014 Reber et al.
D718,293 S 11/2014 Namminga
8,891,800 B1 11/2014 Shaffer
8,894,420 B2 11/2014 Schichl et al.
8,907,783 B2 12/2014 Fish et al.
8,911,246 B2 12/2014 Carnevali
8,917,506 B2 12/2014 Diebel et al.
8,929,065 B2 1/2015 Williams
8,950,717 B2 2/2015 Chuang
8,970,332 B2 3/2015 DiFonzo et al.
9,007,758 B2 4/2015 Wilson et al.
9,011,184 B2 4/2015 Chen et al.
9,019,698 B2 4/2015 Thiers
9,026,187 B2 5/2015 Huang
9,036,343 B2 5/2015 Carnevali
9,071,060 B2 6/2015 Fathollahi
9,072,172 B2 6/2015 Hsu
9,077,794 B2 7/2015 Narendra et al.
9,089,059 B1 7/2015 Haskin et al.
9,112,304 B2 8/2015 Rohrbach et al.
9,123,935 B2 9/2015 Huang
9,147,966 B2 9/2015 An
9,172,781 B1 10/2015 Goldstein
9,195,279 B2 11/2015 Carnevali et al.
9,201,593 B2 12/2015 Collopy et al.
9,229,494 B2 1/2016 Rayner
9,288,295 B2 3/2016 Ivanovski et al.
9,298,661 B2 3/2016 Hamel et al.
9,300,078 B2 3/2016 Liu et al.
9,300,081 B2 3/2016 Rudisill et al.
9,331,444 B2 5/2016 Carnevali
9,356,267 B1 5/2016 To et al.
9,495,375 B2 11/2016 Huang et al.
9,529,387 B2 12/2016 Carnevali
9,535,457 B1 1/2017 Vier
9,567,776 B2 2/2017 Moock et al.
9,570,872 B2 * 2/2017 Carnevali ............. G06F 1/1632
9,591,113 B2 3/2017 Filser et al.
9,602,639 B2 3/2017 Carnevali
9,632,535 B2 4/2017 Carnevali et al.
9,647,474 B2 5/2017 Fathollahi et al.
9,706,026 B2 7/2017 Carnevali
9,742,885 B2 8/2017 Rostami
9,748,535 B2 8/2017 Huang et al.
9,760,116 B2 9/2017 Wylie
9,762,013 B2 9/2017 George et al.
9,774,713 B2 9/2017 Guerdrum et al.
9,776,577 B2 10/2017 Carnevali
9,807,211 B2 10/2017 Guerdrum et al.
9,809,175 B2 11/2017 Jonik et al.
9,817,441 B1 11/2017 Kuo
9,831,904 B1 11/2017 Carnevali
9,855,390 B2 * 1/2018 Bisegna ............ A61M 5/31513
9,898,041 B2 2/2018 Blowers et al.
9,924,005 B1 3/2018 McElderry
9,939,850 B2 4/2018 Hoellwarth et al.
9,997,876 B2 * 6/2018 Kasar ................. H01R 13/5227
10,033,204 B2 7/2018 Huang et al.
10,050,658 B2 8/2018 Carnevali
10,054,984 B2 8/2018 Carnevali et al.
10,148,104 B2 12/2018 Sa
10,170,738 B2 1/2019 Huang et al.
10,172,246 B2 1/2019 Apter
10,330,251 B2 6/2019 Carnevali
10,389,399 B2 8/2019 Carnevali
10,401,905 B2 9/2019 Carnevali
10,416,715 B1 9/2019 Wade et al.
10,454,515 B2 10/2019 Carnevali
10,485,312 B2 11/2019 Rodriguez
10,516,431 B2 12/2019 DiLella
10,548,380 B2 2/2020 Rayner et al.
10,559,788 B2 2/2020 Huang et al.
10,630,334 B2 4/2020 Carnevali
10,656,687 B2 5/2020 Tashiro et al.
10,666,309 B2 5/2020 Carnevali
10,707,632 B1 7/2020 Yamamoto et al.
10,714,953 B1 7/2020 Solana et al.
10,778,275 B2 9/2020 Carnevali
10,788,857 B2 9/2020 Huang et al.
10,812,643 B1 10/2020 Carnevali et al.
D903,685 S 12/2020 Wright et al.
10,928,856 B1 2/2021 Hamlin et al.
D915,373 S 4/2021 Zhou
10,976,777 B2 4/2021 Pischel
10,996,714 B1 * 5/2021 Godfrey ................ G06F 1/1601
11,029,731 B1 6/2021 Carnevali
D924,863 S 7/2021 Wright et al.
11,076,032 B1 7/2021 Carnevali
11,165,458 B2 11/2021 Carnevali
11,277,506 B2 3/2022 Carnevali
11,289,864 B2 3/2022 Carnevali et al.
11,489,350 B2 11/2022 Carnevali
11,522,379 B2 12/2022 Lee et al.
11,597,334 B2 3/2023 Telesco et al.
11,619,971 B1 4/2023 Passe et al.
11,622,032 B2 4/2023 Wright et al.
11,652,326 B2 5/2023 Carnevali
12,132,511 B2 10/2024 Carnevali
D1,052,884 S 12/2024 Hong
2002/0009194 A1 1/2002 Wong et al.
2002/0032041 A1 3/2002 Hirai et al.
2002/0136557 A1 9/2002 Shimamura
2002/0191782 A1 12/2002 Beger et al.
2002/0193136 A1 12/2002 Halkosaari et al.
2003/0068986 A1 4/2003 Ph
2003/0116631 A1 6/2003 Salvato et al.
2003/0218445 A1 11/2003 Behar
2004/0108348 A1 6/2004 Barnes
2004/0209489 A1 10/2004 Clapper
2005/0189354 A1 9/2005 Heather et al.
2006/0058073 A1 3/2006 Kim
2006/0175766 A1 8/2006 Carnevali
2007/0127204 A1 6/2007 Muenzer et al.
2007/0261978 A1 11/2007 Sanderson
2008/0053770 A1 3/2008 Tynyk
2008/0104301 A1 5/2008 Assouad et al.
2008/0149796 A1 6/2008 Moscovitch
2008/0273734 A1 11/2008 Solland
2008/0320190 A1 12/2008 Lydon et al.
2009/0021903 A1 1/2009 Chen et al.
2009/0140113 A1 6/2009 Carnevali
2009/0160400 A1 6/2009 Woud
2009/0314400 A1 12/2009 Liu
2010/0013431 A1 1/2010 Liu
2010/0078343 A1 4/2010 Hoellwarth et al.
2011/0122565 A1 5/2011 Liu

(56) References Cited

U.S. PATENT DOCUMENTS

| | | | |
|---|---|---|---|
| 2011/0134601 A1 | 6/2011 | Sa | |
| 2011/0159324 A1 | 6/2011 | Huang et al. | |
| 2011/0287726 A1 | 11/2011 | Huang | |
| 2011/0299238 A1 | 12/2011 | Radin et al. | |
| 2012/0018325 A1 | 1/2012 | Kim | |
| 2012/0043235 A1 | 2/2012 | Klement | |
| 2012/0088558 A1 | 4/2012 | Song | |
| 2012/0118773 A1 | 5/2012 | Rayner | |
| 2012/0161706 A1 | 6/2012 | Zhou | |
| 2012/0211382 A1 | 8/2012 | Rayner | |
| 2012/0250270 A1 | 10/2012 | Liu | |
| 2012/0261306 A1 | 10/2012 | Richardson et al. | |
| 2012/0298536 A1 | 11/2012 | Rauta et al. | |
| 2012/0303520 A1 | 11/2012 | Huang | |
| 2013/0002193 A1 | 1/2013 | Aldana et al. | |
| 2013/0023313 A1 | 1/2013 | Kim | |
| 2013/0088188 A1 | 4/2013 | Romanenko | |
| 2013/0092576 A1 | 4/2013 | Rayner | |
| 2013/0106353 A1 | 5/2013 | Foster | |
| 2013/0193006 A1 | 8/2013 | Bergreen et al. | |
| 2013/0220841 A1 | 8/2013 | Yang | |
| 2013/0222991 A1 | 8/2013 | McWilliams | |
| 2013/0258573 A1 | 10/2013 | Muday et al. | |
| 2013/0273752 A1 | 10/2013 | Rudisill et al. | |
| 2013/0273983 A1 | 10/2013 | Hsu | |
| 2013/0300267 A1 | 11/2013 | Richardson et al. | |
| 2013/0322568 A1 | 12/2013 | Pais et al. | |
| 2013/0331156 A1 | 12/2013 | Lui | |
| 2013/0334071 A1 | 12/2013 | Carnevali | |
| 2014/0035511 A1 | 2/2014 | Ferber et al. | |
| 2014/0036420 A1 | 2/2014 | Chen | |
| 2014/0042285 A1 | 2/2014 | Carnevali | |
| 2014/0055928 A1 | 2/2014 | Lee | |
| 2014/0059264 A1 | 2/2014 | Sudak | |
| 2014/0065948 A1 | 3/2014 | Huang | |
| 2014/0066144 A1 | 3/2014 | Hong | |
| 2014/0070774 A1 | 3/2014 | Terlizzi et al. | |
| 2014/0099526 A1 | 4/2014 | Powell et al. | |
| 2014/0168885 A1 | 6/2014 | Williams | |
| 2014/0307376 A1 | 10/2014 | Lee | |
| 2014/0347000 A1 | 11/2014 | Hamann et al. | |
| 2014/0363988 A1 | 12/2014 | An | |
| 2015/0011099 A1 | 1/2015 | Kim et al. | |
| 2015/0055289 A1 | 2/2015 | Chang et al. | |
| 2015/0087163 A1 * | 3/2015 | Salter ................ | B29C 45/14467 264/261 |
| 2015/0098184 A1 | 4/2015 | Tsai et al. | |
| 2015/0146401 A1 | 5/2015 | Su et al. | |
| 2015/0189780 A1 | 7/2015 | Su et al. | |
| 2015/0270861 A1 | 9/2015 | Lin et al. | |
| 2016/0065702 A1 | 3/2016 | Carnevali | |
| 2016/0231779 A1 | 8/2016 | Kaneko et al. | |
| 2016/0309010 A1 | 10/2016 | Carnevali | |
| 2017/0054312 A1 | 2/2017 | Kuchynka et al. | |
| 2017/0227987 A1 | 8/2017 | Carnevali et al. | |
| 2018/0279809 A1 | 10/2018 | Regan et al. | |
| 2018/0314296 A1 | 11/2018 | Evns, V et al. | |
| 2019/0267825 A1 | 8/2019 | Chien | |
| 2020/0195763 A1 | 6/2020 | Ellis | |
| 2020/0197563 A1 | 6/2020 | Shen et al. | |
| 2020/0326955 A1 | 10/2020 | Adiletta et al. | |
| 2020/0330037 A1 | 10/2020 | Al-Ali et al. | |
| 2020/0371555 A1 | 11/2020 | Huang et al. | |
| 2021/0048848 A1 | 2/2021 | Pischel | |
| 2021/0194256 A1 | 6/2021 | Carnevali | |
| 2021/0391678 A1 | 12/2021 | Carnevali | |
| 2021/0392773 A1 | 12/2021 | Carnevali | |
| 2022/0026951 A1 | 1/2022 | Wood, III et al. | |
| 2022/0066505 A1 | 3/2022 | Lu et al. | |
| 2022/0253097 A1 | 8/2022 | Carnevali et al. | |
| 2022/0352682 A1 | 11/2022 | Carnevali | |
| 2023/0039167 A1 | 2/2023 | Kamepalli et al. | |
| 2023/0045485 A1 | 2/2023 | Carnevali et al. | |
| 2023/0341897 A1 | 10/2023 | Carnevali et al. | |
| 2024/0399976 A1 | 12/2024 | Carnevali et al. | |
| 2024/0403251 A1 | 12/2024 | Anderson | |
| 2025/0224768 A1 | 7/2025 | Carnevali | |
| 2025/0226846 A1 | 7/2025 | Carnevali | |

FOREIGN PATENT DOCUMENTS

| | | |
|---|---|---|
| CN | 202268924 | 6/2012 |
| CN | 202565335 | 11/2012 |
| CN | 204334055 | 5/2015 |
| CN | 204334674 | 5/2015 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| KR | 101609754 B1 | 4/2016 |
| TW | 2003TW531119 | 5/2003 |
| TW | M422808 | 2/2012 |
| WO | 2012/052751 | 4/2012 |
| WO | 2013/081222 | 6/2013 |
| WO | WO 2014/010781 A1 | 1/2014 |
| WO | 2014/054426 | 4/2014 |
| WO | 2015/022675 | 2/2015 |

OTHER PUBLICATIONS

Officeonthego.com, 3 pages of product description of Magnifico ®Plus screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

Battery Charging Specification (Including errata and ECNs through Mar. 15, 2012); Revision 1.2, Mar. 15, 2012. 72 pages.

U.S. Appl. No. 18/590,837, filed Feb. 28, 2024.

U.S. Appl. No. 18/612,977, filed Mar. 21, 2024.

U.S. Appl. No. 18/218,381, filed Jul. 5, 2023.

U.S. Appl. No. 18/404,795, filed Jan. 4, 2024.

U.S. Appl. No. 18/614,482, filed Mar. 22, 2024.

U.S. Appl. No. 18/638,430, filed Apr. 17, 2024.

MC40 Integrator Guide, Motorola Solutions, Inc., Oct. 4, 2013.

Various documents for iPort LaunchPort Product, alleged to have been available as early as 2013.

Juice Pack System Air Manual—Juice Pack System Air alleged to have been available as early as Feb. 6, 2013.

Juice Pack System Press Releases dated Jun. 14, 2011; Jun. 19, 2012; and Feb. 6, 2013.

Juice Pack System Dock Manual—Juice Pack System Dock alleged to have been available as early as Feb. 6, 2013.

Juice Pack System images—Juice Pack System alleged to have been available as early as Feb. 6, 2013.

Juice Pack System Helium Manual—Juice Pack System Helium alleged to have been available as early as Feb. 6, 2013.

Juice Pack System Add-Ons—Juice Pack System alleged to have been available as early as Feb. 6, 2013.

Juice Pack System Plus iPhone 6 Manual—Juice Pack System Plus alleged to have been available as early as Feb. 6, 2013.

Juice Pack System Dock Page IA—Juice Pack System Dock alleged to have been available as early as Feb. 6, 2013.

Wildcharge System reviews—Wildcharge System alleged to have been available as early as Mar. 23, 2008.

Wildcharge System articles dated Mar. 23, 2008; Jun. 23, 2009; and Sep. 2009.

Wildcharge System webpages—Wildcharge System alleged to have been available as early as Mar. 23, 2008 and these webpages alllegedly are from 2009 and 2010.

Wildcharge System Press Release from Nov. 13, 2007.

Wildcharge System WildCharge Wire Free Power alleged to have been available as early as Mar. 23, 2008.

(56) References Cited

OTHER PUBLICATIONS

Wildcharge System WildCharge Skin for iPhone alleged to have been available as early as Mar. 23, 2008.
Wildcharge System images—Wildcharge System alleged to have been available as early as Mar. 23, 2008.

* cited by examiner

DOCK WITH ISOLATED DOCK CONNECTOR AND METHODS OF MAKING AND USING

FIELD

The present invention is directed to a dock for an electronic device. The present invention is also directed to a dock with an isolated dock connector and methods of making and using the dock.

BACKGROUND

Mobile devices, such as smartphones, cellular or mobile phones, tablets, personal data assistants, and other portable devices, are now ubiquitous. Docks can be used to protect the mobile device, to couple the mobile device to a source of power or data, or to mount the mobile device onto a surface or object or any combination thereof.

BRIEF SUMMARY

One embodiment is a dock for an electronic device. The dock includes a base configured to fit over at least a portion of a back surface of the electronic device; a tray extending from the base for receiving one side of the electronic device; and a dock connector arrangement that includes a dock connector formed of a first rigid plastic material, a plurality of contacts extending out of, or disposed on, the dock connector, an elastomeric sleeve molded around at least a perimeter of the dock connector, and a contact box, wherein at least a portion of the contact box is molded around at least a perimeter of the elastomeric sleeve, wherein at least the portion of the contact box is formed of a second rigid plastic material, wherein the contact box is coupled to, or part of, the base or the tray.

Another embodiment is a dock for an electronic device. The dock includes a base configured to fit over at least a portion of a back surface of the electronic device; a tray extending from the base for receiving one side of the electronic device; and a dock connector arrangement that includes a dock connector formed of a first hard plastic material, a plurality of contacts extending out of, or disposed on, the dock connector, a sleeve formed of a soft plastic material and disposed around at least a perimeter of the dock connector, and a contact box, wherein at least a portion of the contact box is disposed around at least a perimeter of the sleeve, wherein at least the portion of the contact box is formed of a second hard plastic material, wherein the contact box is coupled to, or part of, the base or the tray.

A further embodiment is a method of making a dock for an electronic device. The method includes molding an elastomeric sleeve around at least a perimeter of a dock connector, wherein the dock connector is formed of a first rigid plastic material; and molding at least a portion of a contact box around at least a perimeter of the elastomeric sleeve, wherein at least the portion of the contact box is formed of a second rigid plastic material.

In at least some embodiments, either the first rigid or hard plastic material of the dock connector or the second rigid or hard plastic material of the portion of the contact box has a hardness of at least 70 on the Shore D scale or at least 100 on the Rockwell scale. In at least some embodiments, either the first rigid or hard plastic material of the dock connector or the second rigid plastic material of the portion of the contact box has a hardness in a range of 70 to 80 on a Shore D scale or in a range of 100 to 120 on a Rockwell R scale.

In at least some embodiments, the elastomeric sleeve includes an elastomeric material having a hardness of no more than 98 on a Shore A scale. In at least some embodiments, the soft plastic material has a hardness of no more than 98 on a Shore A scale.

In at least some embodiments, at least one of the first rigid or hard plastic material or the second rigid or hard plastic material includes acrylonitrile butadiene styrene (ABS), polycarbonate (PC), or a combination thereof. In at least some embodiments, the elastomeric sleeve includes an elastomeric material selected from thermoplastic rubber (TPR), thermoplastic elastomer (TPE), thermoplastic urethane (TPU), or any combination thereof. In at least some embodiments, the soft plastic material includes thermoplastic rubber (TPR), thermoplastic elastomer (TPE), thermoplastic urethane (TPU), or any combination thereof.

In at least some embodiments, the dock connector has a plurality of openings, wherein the contacts extend through the openings of the dock connector. In at least some embodiments, the first rigid material and the second rigid material are the same.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to a dock for an electronic device. The present invention is also directed to a dock with an isolated dock connector and methods of making and using the dock.

Figure 1A:
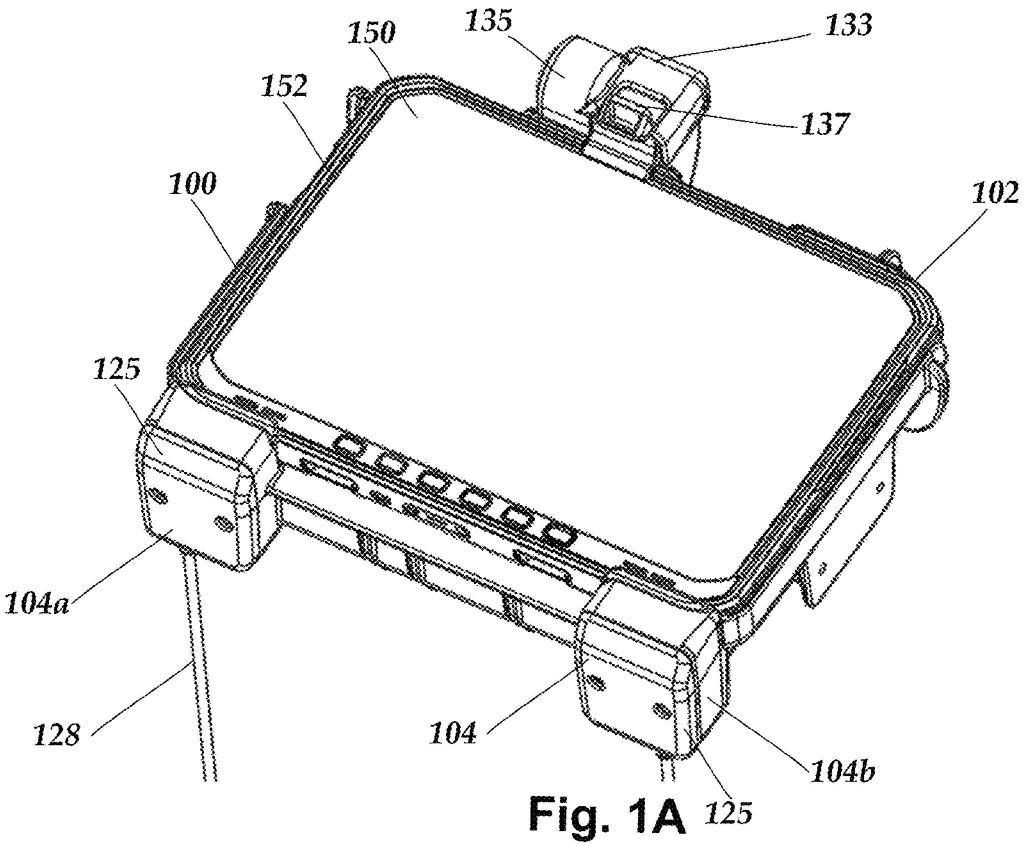
FIG. 1A is a schematic perspective top view of one embodiment of a dock with an electronic device disposed therein, according to the invention.
Figure 1B:
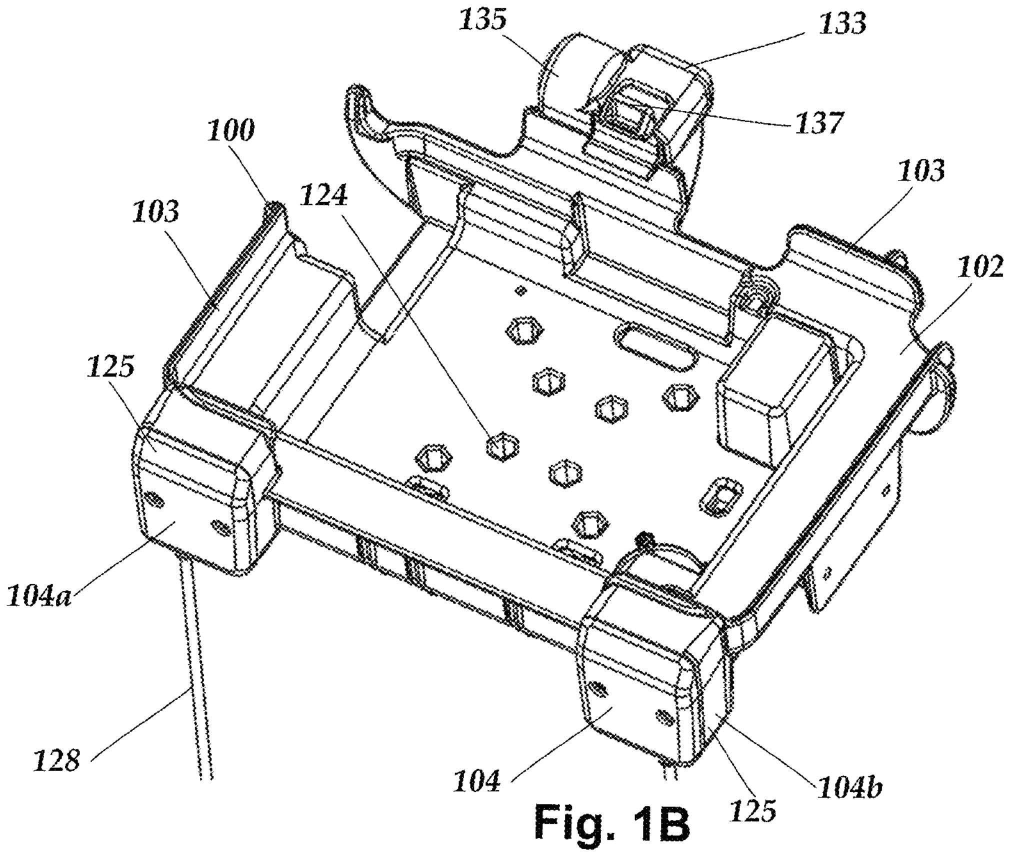
FIG. 1B is a schematic perspective top view of the dock of FIG. 1A without the electronic device, according to the invention.
Figure 1C:
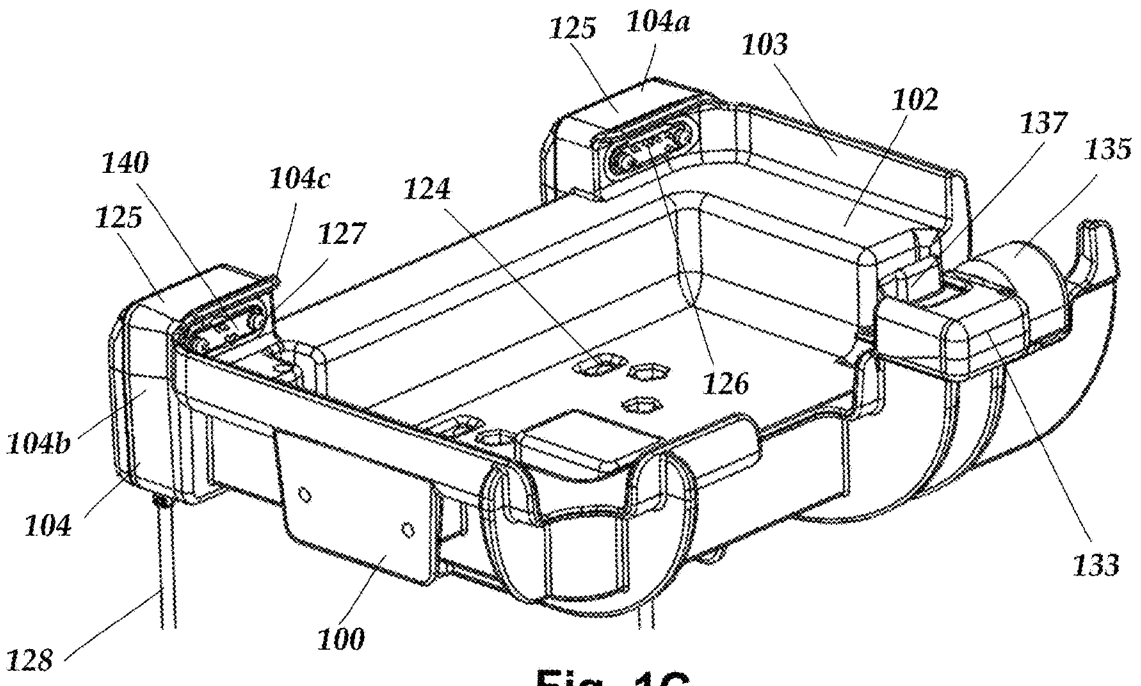
FIG. 1C is a schematic perspective top view of the dock of FIG. 1A without the electronic device and from an angle to show two dock connector arrangements, according to the invention.

FIGS. 1A, 1B, and 1C illustrate one embodiment of a dock 100. The dock 100 can receive an electronic device 150 that is optionally disposed in a case 152. The electronic device 150 can be any suitable portable device such as, but not limited to, a mobile phone (e.g., a cellphone or a smartphone), a tablet, a personal data assistant, a laptop computer, or the like. In at least some embodiments, the dock 100 is designed, sized, or arranged for one or more specific types or models of electronic device(s) 150.

The dock 100 includes a base 102 that is arranged to be disposed beneath the electronic device 150 and a tray 104 extending from the base 102 for receiving one side of the case 152 and electronic device 150. In the illustrated embodiment, the tray is formed in two parts 104*a*, 104*b*. In at least some embodiments, the tray 104 includes one or more portions 104*c* (FIG. 1C) that extend over a part of the front surface of the electronic device 150 to retain the electronic device in the dock 100. In at least some embodiments, the dock 100 may also include one or more retaining sidewalls 103 that fit around one or more sides of the electronic device 150, for example, to facilitate protection, alignment, or retention of the electronic device in the dock. In at least some embodiments, the base 102, tray, 104, or sidewall 103 can include one or more grooves, ridges, tabs, or tab-receiving openings to facilitate retention of the electronic device 150 (optionally with the case 152) in the dock 100.

In at least some embodiments, the dock 100 can include a locking mechanism 133 with a lock 135 and a sliding tab 137 that can fit over a portion of the front surface of the electronic device 150 to hold the electronic device in the dock. In at least some other embodiments, the dock 100 can include one or more attachment arms 106 extending from the base for retaining the electronic device 150 in the dock. Examples of other docks with attachment arms can be found in U.S. patent application Ser. Nos. 16/298,952 and 17/174,152, both of which are incorporated herein by reference in their entireties.

In at least some embodiments, one or more accessories are attached or attachable to the dock 100. Example of such accessories include, but are not limited to, a mount, a fan, or the like or any combination thereof. In at least some embodiments, the dock 100 includes a mounting arrangement (not shown) having multiple attachment apertures 124 (FIG. 1B) for receiving a fastener to attach a mount to the mounting arrangement. The mount can be any suitable mount that can be attached to a mounting device. Non-limiting examples of mounts, mounting arrangements, and mounting devices can be found at, for example, U.S. Pat. Nos. 5,845,885; 6,561,476; 7,320,50; 7,997,554; 8,454,178; 8,505,861; 9,831,904; RE42,060; RE42,581; and RE43,806 and U.S. patent application Ser. Nos. 16/298,952 and 17/174,152, all of which are incorporated herein by reference in their entireties.

The dock 100 also includes one or more contact boxes 125 attached to, or forming part of, the tray 104 or the base 102 (or both) of the dock. As illustrated in FIG. 1C, one or more contacts 126 and one or more guide pins 127 (e.g., location pins) extend out of the contact box 125. The contacts 126 are configured to couple to contacts on the case 152 or electronic device 150. The contacts 126 can be suitable for delivering power, data, or the like to the electronic device 150. The dock 100 can include any number of contacts 126 such as, for example, one, two, four, six, eight, ten, twelve, sixteen or more contacts or any other suitable number of contacts. Any type of contact 126 can be used including, but not limited to, stationary contacts, pogo pins, other movable contacts, pins, contact pads, or the like or any combination thereof. For a dock 100 having multiple contact boxes 125, the arrangement of the contacts 126 associated with each contact box can be the same or can be different (for example, see, FIG. 1C).

In at least some embodiments, the guide pins 127 facilitate the alignment of electronic device 150 in the dock 100 or alignment of the contacts on the electronic device 150 or case 152 with the contacts 126 of the dock 100. The dock 100 can include any number of guide pins 127 such as, for example, one, two, three, four, or more guide pins. For a dock 100 having multiple contact boxes 125, one, two, three, four, or more guide pins 127 can be associated with each contact box.

The contacts 126 are coupled to wires 130 (see, FIG. 3B-only one wire is illustrated for clarity purposes) or other conductors that are carried, in part, by at least one cord 128 that extends from the contact box 125 of the dock 100. In the illustrated embodiment, there are two contact boxes 125 that each have a cord 128 extending therefrom. In at least some embodiments, any cord 128 can have a connector at the other end. In at least some embodiments, any cord 128 can be hardwired, or hardwireable, into another device that can provide the power, data, or the like. In at least some embodiments, the cord(s) 128 may be used to tether the dock 100 to an external structure to hinder or prevent removal of the dock from the external structure (e.g., a vehicle, platform, or the like). Any other mechanism can be used to tether or fix the dock 100 to an external structure.

In at least some instances, when the contact box(es) 125, tray 104, and base 102 are molded, small variations in the dimensions of these elements are observed among the manufactured docks 100. Moreover, the dock 100 can experience minor changes in shape over time. These effects can result in a degree of misalignment between the contacts 126 of the dock 100 and the contacts of the electronic device 150. In addition, the electronic device 150 may exhibit some movement within the dock 100 due to vibration, shocks, or the like. For example, an electronic device 150 in a dock 100 secured to a vehicle can experience vibration or shocks while the vehicle is in motion. In at least some instances, the vibration or shock can result in breaking connections between the contacts 126 of the dock 100 and the contacts of the electronic device 150.

To address, for example, misalignment, vibration, or shock, it can be useful to allow the guide pins 127 or contacts 126 to move relative to base 102 and other portions of the dock 100. This allows the guide pins 127 or contacts 126 to float relative to the base 102 and other portions of the dock 100. In at least some embodiments, insertion of the electronic device 150 into the dock 100 and engagement of the guide pins 127 by the electronic device can move the contacts 126 relative to the base 102 and other portions of the dock 100 to provide good alignment between the contacts 126 of the dock and the contacts of the electronic device. In at least some embodiments, vibration or other movement of the electronic device 150 relative to the base 102 or other portions of the dock 100 can result in the electronic device pushing against the guide pins 127. Allowing the guide pins 127 to float with the electronic device 150 can facilitate maintenance of contact between the contacts of the dock and the contacts of the electronic device.

A dock connector arrangement 140 is disposed within the contact box 125 of the dock 100 and includes a dock connector 142 and an elastomeric sleeve 144 disposed around at least a perimeter of the dock connector 142 and in contact with the contact box 125. At least one face of the dock connector 142 is exposed so that the contacts 126 and guide pins 127 are accessible to the electronic device 150 or case 151. The dock connector 142 includes the contacts 126 disposed thereon or has openings from which the contacts 126 (for example, pogo pins) extend. The guide pins 127 can extend through openings in the dock connector 142 or are attached to the dock connector.

The elastomeric sleeve 144 acts as an interface between the dock connector 142 and the contact box 125. The flexible or compressible nature of the elastomeric sleeve 144 allows the dock connector 142 and the associated guide pins 127 and contacts 126 to move relative to the contact box 125, the base 102, and other portions of the dock 100.

Figure 2A:
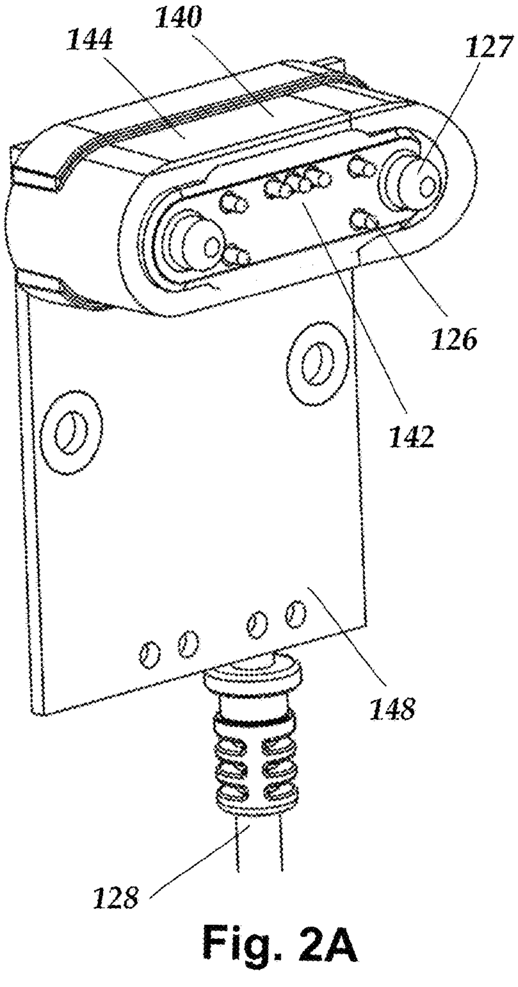
FIG. 2A is a schematic perspective front view of one embodiment of a dock connector arrangement with a cord attached thereto, according to the invention.
Figure 2B:
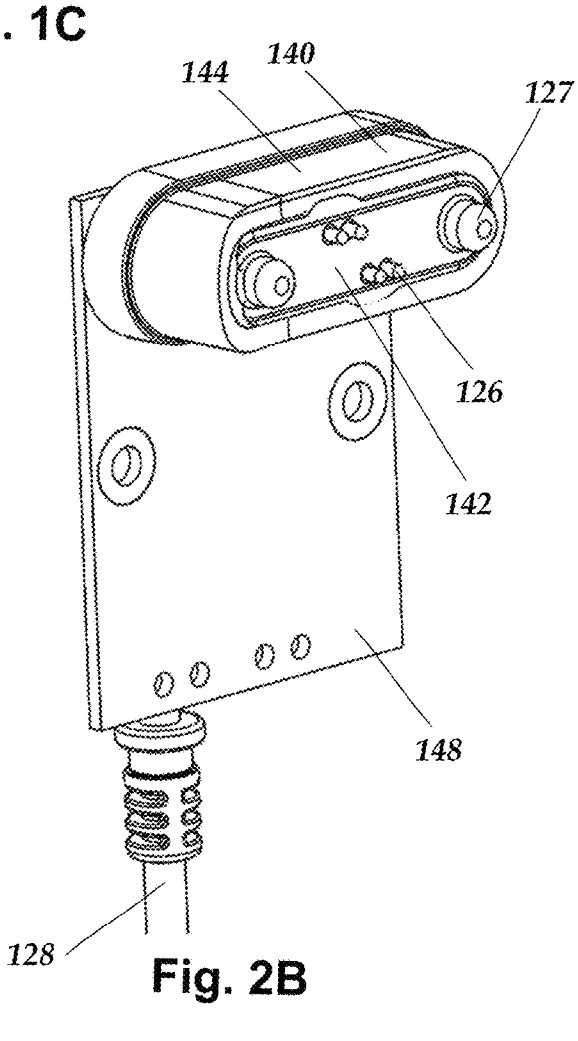
FIG. 2B is a schematic perspective front view of another embodiment of a dock connector arrangement with a cord attached thereto, according to the invention.
Figure 2C:
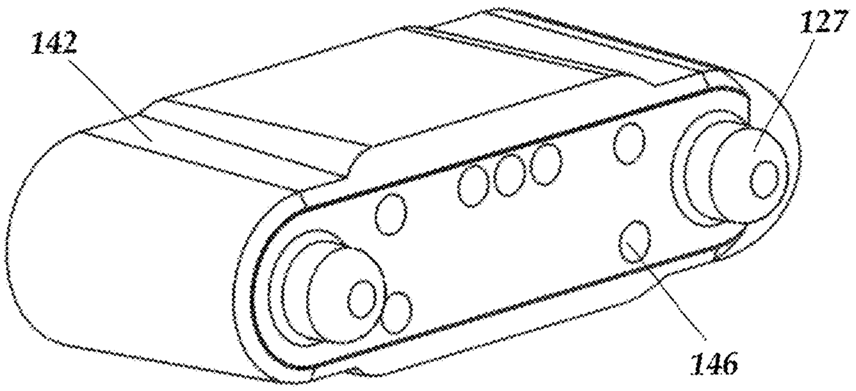
FIG. 2C is a schematic perspective front view of a dock connector of the dock connector arrangement of FIG. 2A, according to the invention.
Figure 2D:
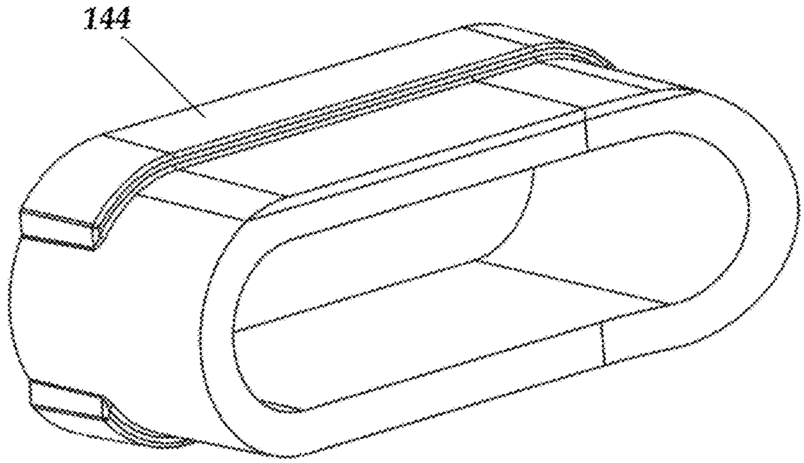
FIG. 2D is a schematic perspective front view of an elastomeric sleeve of the dock connector arrangement of FIG. 2A, according to the invention.
Figure 2E:
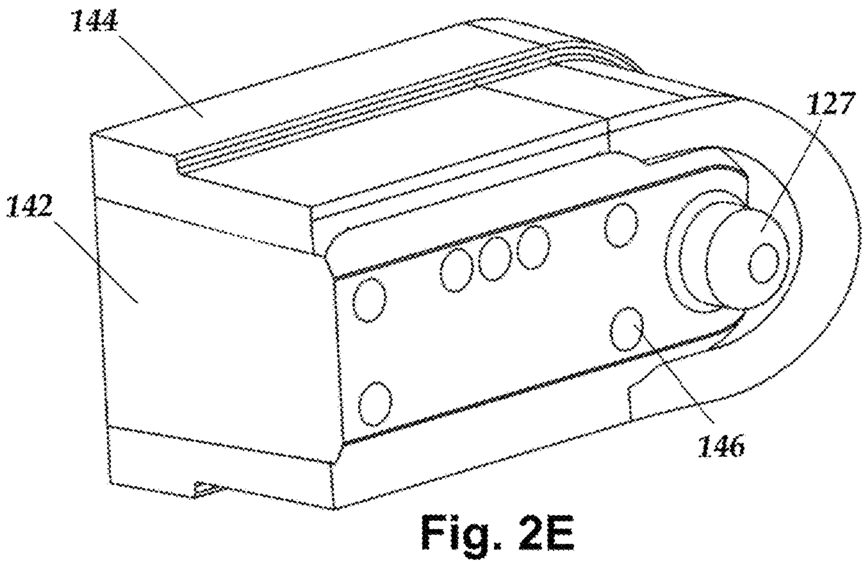
FIG. 2E is a schematic perspective front view of a combination of the dock connector of FIG. 2C and the elastomeric sleeve of FIG. 2D, according to the invention.

FIGS. 2A and 2B illustrate two different embodiments of a dock connector arrangement 140. FIG. 2C illustrates one embodiment of the dock connector 142 with guide pins 127 and openings 146 for the contacts. FIG. 2D illustrates one embodiment of the elastomeric sleeve 144. FIG. 2E illustrates the elastomeric sleeve 144 disposed around the dock connector 142. FIGS. 2A and 2B illustrate two embodiments of the dock connector arrangement 140 illustrating the dock connector 142, elastomeric sleeve 144, guide pins 127, contacts 126, and substrate 148 (for example, a printed circuit board (PCB)), as well as the cord 128 attached to the dock connector arrangement. In at least some embodiments, contact 126, such as pogo pins, are attached to the substrate 148. In at least some embodiments, the substrate 148 floats or moves with the contacts 126 and dock connector 142. In at least some embodiments, conductors are printed or otherwise disposed on the substrate 148 for electrically coupling the contacts 126 to the wires 130 of the cord 128.

FIGS. 2A and 2B illustrate two different arrangements of the contacts 126. For example, in at least some embodiments, one dock connector arrangement 140 may be coupled to a power source and another dock connector arrangement coupled to a data source. In at least some embodiments, the different contact arrangements arise from the different sources to which the separated dock connector arrangements are coupled.

The dock connector 142 and the contact box 125 are made using a rigid or hard plastic, such as, for example, acrylonitrile butadiene styrene (ABS), polycarbonate (PC), nylon, or the like or any combination thereof (e.g., ABS/PC). The material of the dock connector 142 and the contact box 125 can be the same or can be different. In at least some embodiments, the material(s) of the dock connector 142 and the contact box 125 (which can be the same or can be different) have a hardness of at least 70 on the Shore D scale or at least 100 on the Rockwell scale. In at least some embodiments, the material(s) of the dock connector 142 and the contact box 125 have a hardness in a range of 70 to 80 on the Shore D scale or in a range of 100 to 120 on the Rockwell R scale.

The elastomeric sleeve 144 is made of any suitable elastomeric or soft material, such as, for example, thermoplastic rubber (TPR), thermoplastic elastomer (TPE), thermoplastic urethane (TPU), or the like or any combination thereof. In at least some embodiments, the material(s) of the elastomeric sleeve 144 have a hardness of no more than 98 on the Shore A scale. In at least some embodiments, the material of the elastomeric sleeve 144 has a hardness in a range of 35 to 98 on the Shore A scale.

One embodiment of making the dock 100 includes molding the dock connector 142 using a rigid or hard plastic, such as, for example, ABS/PC. The elastomeric sleeve 144, formed using, for example, a TPR, TPU, or TPE elastomeric or soft material, is molded over at least a perimeter of the dock connector 142 leaving at least one face of the dock connector exposed. Materials, such as TPR/TPE/TPU elastomeric or soft materials, when molded over ABS/PC or the like, have good adhesion, and bonds, to ABS/PC or the like.

Figure 3A:
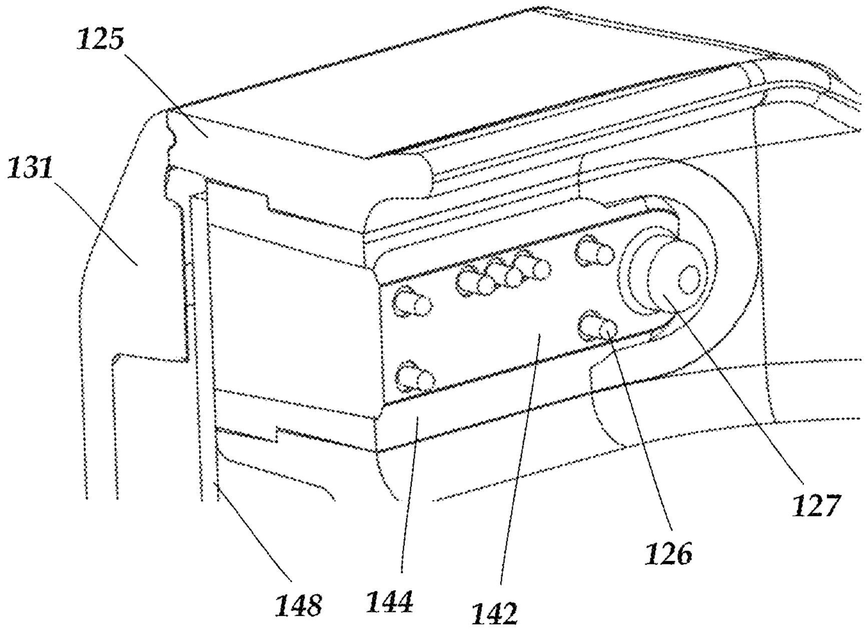
FIG. 3A is a schematic perspective front side view of a portion of the dock connector arrangement of FIG. 2A disposed in a contact box, according to the invention.

Then, at least a portion of the contact box 125 (and, optionally, the base 102 and tray 104) is molded around at least a perimeter of the elastomeric sleeve 144 using a rigid or hard plastic, such as ABS/PC, as illustrated in FIG. 3A. Although the mold temperature and flow temperature for molding of ABS/PC or the like is substantially higher than the mold temperature and flow temperature for molding TPR/TPE/TPU, it is surprisingly found that the molding of ABS/PC or the like to an insert made of TPR/TPE/TPU elastomeric material can be performed and also bonds these two materials. In at least some embodiments, the molding of the elastomeric sleeve 144 to the dock connector 142 and then molding a portion of the contact box 125 to the elastomeric sleeve 144 can produce a water-proof or water-resistant seal. In at least some embodiments, the contact box 125 is water-proof or water-resistant. In at least some embodiments, this arrangement is anti-vibration or vibration-absorbing.

Figure 3B:
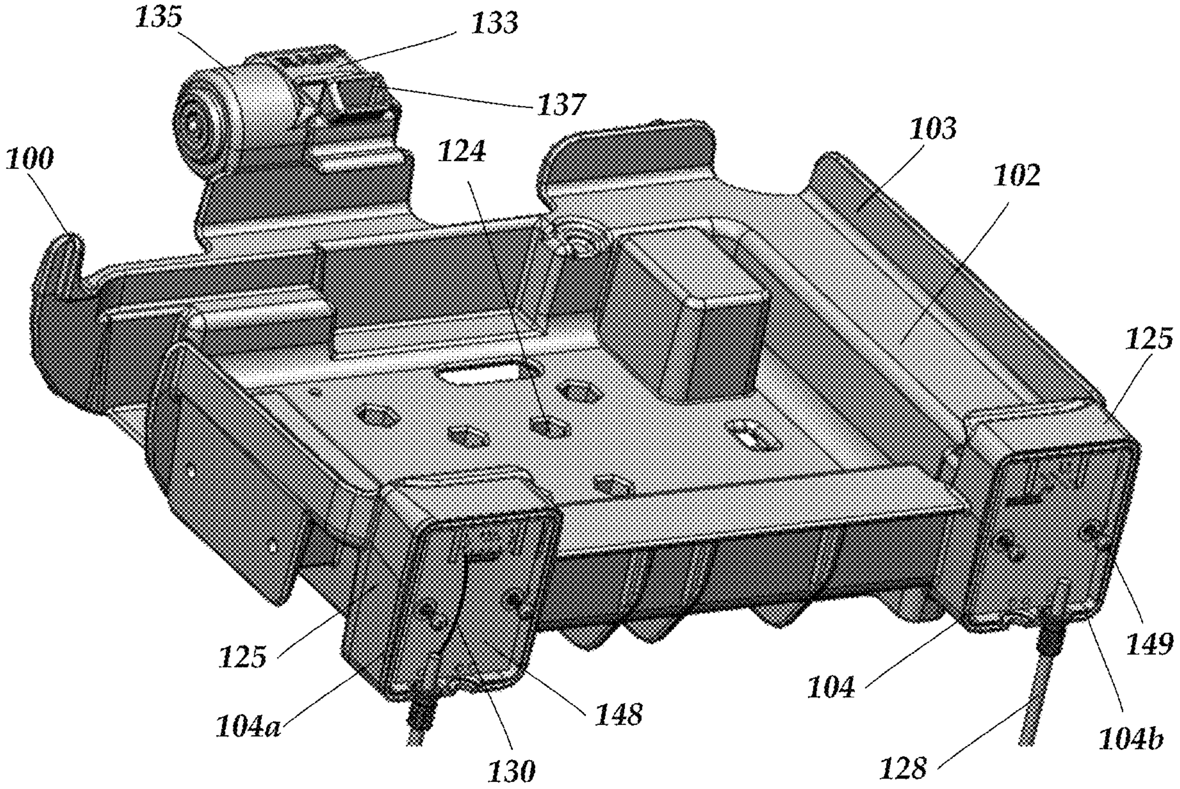
FIG. 3B is a schematic perspective top view of the dock of FIG. 1A without the electronic device with covers of two contact boxes removed, according to the invention.

In at least some embodiments, the contact box 125 includes a cover 131, as illustrated in FIG. 3A, that can be removed, as illustrated in FIG. 3B. The cover 131 can be attached to the contact box 125 (and, optionally, the substrate 148) using one or more fasteners 149, such as screws, bolts, or the like or any other suitable fastener. In at least some embodiments, the cover 131 may be molded or otherwise manufactured separately from the portion of the contact box 125 that is molded around the elastomeric sleeve 144.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A method of making a dock for an electronic device, the method comprising:
- molding an elastomeric sleeve around at least a perimeter of a dock connector, wherein the dock connector is formed of a first rigid plastic material and the elastomeric sleeve is formed of a thermoplastic material; and
- molding at least a portion of a contact box around at least a perimeter of the elastomeric sleeve, wherein at least the portion of the contact box is formed of a second rigid plastic material.

2. The method of claim 1, wherein the second rigid plastic material of the portion of the contact box has a hardness of at least 70 on the Shore D scale or at least 100 on the Rockwell scale.

3. The method of claim 1, wherein the second rigid plastic material of the portion of the contact box has a hardness in a range of 70 to 80 on a Shore D scale or in a range of 100 to 120 on a Rockwell R scale.

4. The method of claim 1, wherein the thermoplastic material has a hardness of no more than 98 on a Shore A scale.

5. The method of claim 1, wherein at least one of the first rigid plastic material or the second rigid plastic material comprises acrylonitrile butadiene styrene (ABS), polycarbonate (PC), or a combination thereof.

6. The method of claim 5, wherein the thermoplastic material is selected from thermoplastic rubber (TPR), thermoplastic elastomer (TPE), thermoplastic urethane (TPU), or any combination thereof.

7. The method of claim 1, wherein the dock connector has a plurality of openings.

8. The method of claim 7, further comprising extending a plurality of contacts out of the openings of the dock connector.

9. The method of claim 1, wherein the first rigid material and the second rigid material are the same.

10. The method of claim 1, wherein molding at least the portion of the contact box around at least the perimeter of the elastomeric sleeve comprises insert molding of the contact box with the elastomeric sleeve comprising an insert.

11. The method of claim 1, wherein molding the elastomeric sleeve around at least the perimeter of the dock connector comprises insert molding of the elastomeric sleeve with the dock connector comprising an insert.

12. The method of claim 1, wherein the dock connector is part of, or attached to, a tray of the dock, wherein the tray is configured for receiving one side of the electronic device.

13. The method of claim 12, wherein the tray extends from a base configured to fit over at least a portion of a back surface of the electronic device.

14. The method of claim 13, wherein molding at least the portion of the contact box around at least the perimeter of the elastomeric sleeve comprises molding the base and the tray with the contact box around at least the perimeter of the elastomeric sleeve.

15. The method of claim 12, wherein the dock connector is part of the tray.

16. The method of claim 12, further comprising attaching the dock connector to the tray.

17. The method of claim 12, wherein molding at least the portion of the contact box around at least the perimeter of the elastomeric sleeve comprises molding the tray with the contact box around at least the perimeter of the elastomeric sleeve.

18. The method of claim 1, further comprising disposing at least one guide pin on the dock connector.

19. The method of claim 1, further comprising attaching a cover to the contact box opposite the dock connector.

20. The method of claim 1, wherein the elastomeric sleeve, dock connector, and contact box form a water-resistant seal.

* * * * *